(12) United States Patent
Vavilala (10) Patent No.: US 10,666,049 B2
(45) Date of Patent: May 26, 2020

(54) POWER-OVER-ETHERNET POWER METHOD AND SYSTEM

(71) Applicant: Cisco Technology, Inc., San Jose, CA (US)

(72) Inventor: Krishna Vavilala, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/771,508

(22) PCT Filed: Jul. 23, 2015

(86) PCT No.: PCT/IB2015/055589
§ 371 (c)(1),
(2) Date: Aug. 31, 2015

(87) PCT Pub. No.: WO2016/185257
PCT Pub. Date: Nov. 24, 2016

(65) Prior Publication Data
US 2018/0131182 A1 May 10, 2018

(30) Foreign Application Priority Data
May 18, 2015 (IN) .......................... 2490/CHE/2015

(51) Int. Cl.
*H02J 3/06* (2006.01)
*G06F 1/26* (2006.01)
*H04L 12/10* (2006.01)

(52) U.S. Cl.
CPC .............. *H02J 3/06* (2013.01); *G06F 1/263* (2013.01); *H04L 12/10* (2013.01); *Y02D 30/30* (2018.01); *Y02D 30/32* (2018.01)

(58) Field of Classification Search
CPC ............. H02J 3/06; G06F 1/263; G06F 1/266
See application file for complete search history.

(56) References Cited

U.S. PATENT DOCUMENTS

| 7,240,224 | B1 | 7/2007 | Biederman |
| 7,664,136 | B2 | 2/2010 | Toebes et al. |
| 8,276,010 | B2 | 9/2012 | Vavilala et al. |
| 8,310,089 | B2 | 11/2012 | Schindler et al. |
| 8,676,393 | B1 | 3/2014 | Hupton et al. |

(Continued)

OTHER PUBLICATIONS

International Search Report dated Jan. 25, 2010 in connection with PCT/IB2015/055589.

*Primary Examiner* — Rexford N Barnie
*Assistant Examiner* — Thai H Tran (57) ABSTRACT

In one embodiment, a method, system, and apparatus including a Power Source Equipment (PSE) device configured to provide Power-over-Ethernet (PoE) to a Powered Device (PD) that is configured to receive a request from the PD requesting a quantity of PoE power, the quantity of PoE power including an amount of power to be provided by the PSE as power for redundancy, receiving a message from the PD, the message including a unique identifier, allocating a requested quantity of PoE power, the allocating of the requested quantity of PoE power including allocating to provide the requested quantity of PoE power from one of a plurality of PSEs, and providing the requested quantity of PoE power to the PD. Related methods, systems, and apparatuses are described.

20 Claims, 4 Drawing Sheets

(56) References Cited

U.S. PATENT DOCUMENTS

| | | |
|---|---|---|
| 8,788,865 B2 | 7/2014 | Mohammed |
| 2006/0092000 A1 | 5/2006 | Karam et al. |
| 2006/0109728 A1* | 5/2006 | Dwelley ................ G06F 1/266 |
| | | 365/222 |
| 2006/0143583 A1 | 6/2006 | Diab et al. |
| 2006/0210057 A1 | 9/2006 | Stanford |
| 2007/0110360 A1* | 5/2007 | Stanford ................ H04L 12/10 |
| | | 385/14 |
| 2008/0052546 A1 | 2/2008 | Schindler et al. |
| 2008/0317021 A1* | 12/2008 | Ives ........................ H04L 12/10 |
| | | 370/389 |
| 2010/0287612 A1* | 11/2010 | Sun ....................... H04L 47/782 |
| | | 726/21 |
| 2011/0004779 A1* | 1/2011 | Karam ..................... H04L 1/22 |
| | | 713/340 |
| 2013/0297955 A1 | 11/2013 | Balasubramanian et al. |
| 2014/0258738 A1 | 9/2014 | Greenwalt et al. |
| 2014/0292070 A1 | 10/2014 | Poh et al. |

* cited by examiner

POWER-OVER-ETHERNET POWER METHOD AND SYSTEM

The present application is a 35 USC § 371 application of as yet unpublished PCT/IB20157/055589, filed on 23 Jul. 2015 and entitled "Power-Over-Ethernet Power Method And System", and which claims the benefit of priority from IN Patent Application IN 2490/CHE/2015 of Cisco Technology, Inc., filed 18 May 2015.

FIELD OF THE INVENTION

The present disclosure relates generally to Power-over-Ethernet.

BACKGROUND OF THE INVENTION

A Power-over-Ethernet (PoE) system includes Power Source Equipment (PSE) to provide a PoE voltage over an Ethernet cable to a Powered Device (PD) to power the PD. Conventionally, the PSE supplies the PoE voltage within a limited PoE voltage range, such as 44-57 Volts (V) as defined in the IEEE 802.3 standard. The supplied PoE voltage is generally set to be substantially higher than a voltage actually needed to power circuits in the PD so as to reduce a power transmission loss in the Ethernet cable connecting the PSE to the PD. The PD typically includes a Direct Current-to-Direct Current (DC-DC) voltage converter to convert the higher voltage down to a lower voltage useable by the circuits in the PD, such as 0.5V or 12V. The DC-DC voltage down-conversion incurs a DC-DC power efficiency conversion loss in the PD. Typical cable runs over which PoE can provide power are as long as 100 meters.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method, system, and apparatus is described, a method, system, and apparatus including a Power Source Equipment (PSE) device configured to provide Power-over-Ethernet (PoE) to a Powered Device (PD) that is configured to receive PoE receiving a request from the PD requesting a quantity of PoE power, the quantity of PoE power including an amount of power to be provided by the PSE as power for redundancy, receiving a message from the PD, the message including a unique identifier, allocating a requested quantity of PoE power, the allocating of the requested quantity of PoE power including allocating to provide the requested quantity of PoE power from one of a plurality of PSEs, and providing the requested quantity of PoE power to the PD. Related methods, systems, and apparatuses are described.

DETAILED DESCRIPTION OF EXEMPLARY EMBODIMENTS

Figure 1:
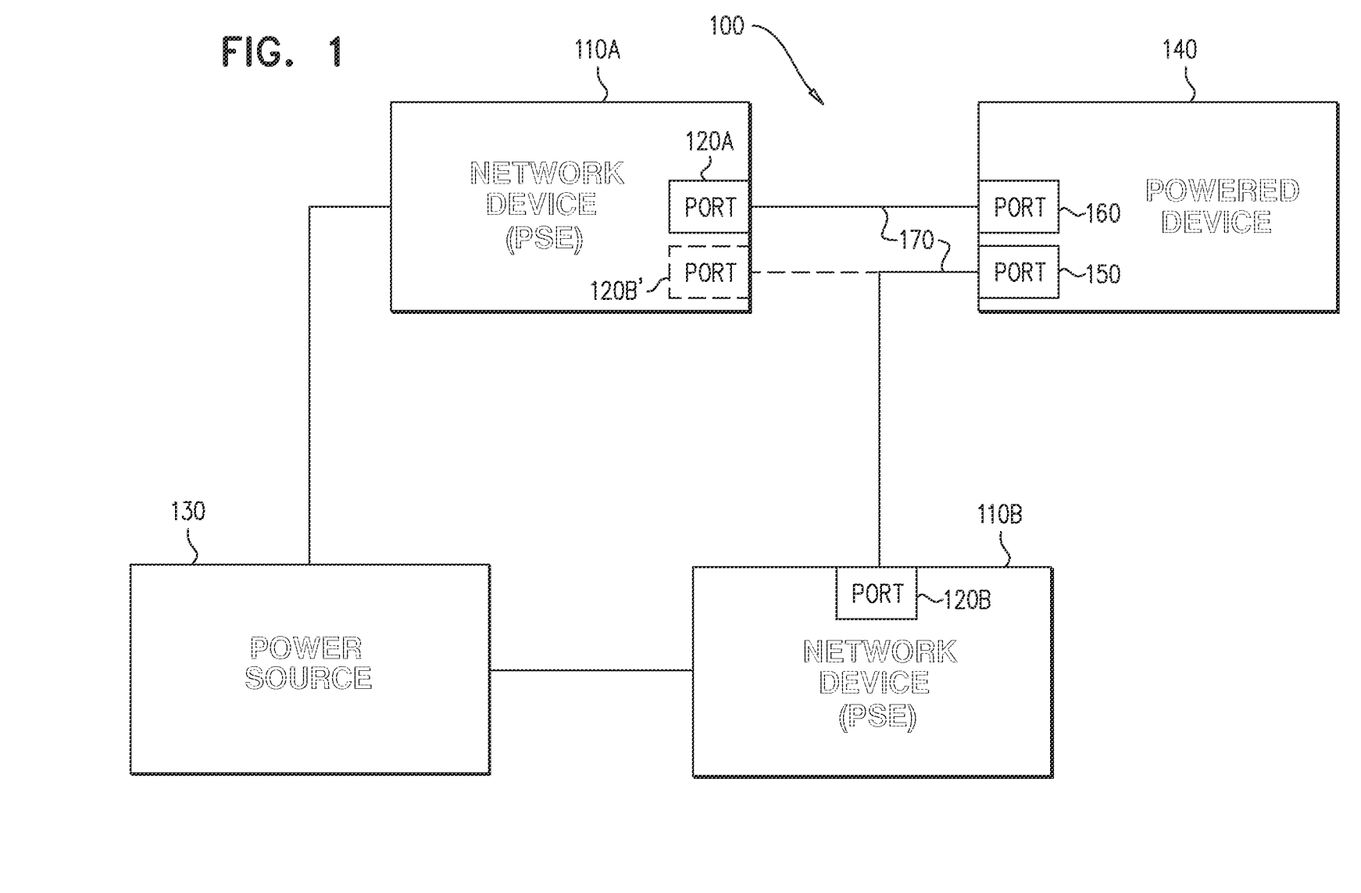
FIG. 1 is a block diagram of an exemplary Power-over-Ethernet (PoE) system in which a plurality of Power Source Equipment (PSE) devices manage allocation for redundant links to a Powered Device (PD), constructed and operative in accordance with an exemplary embodiment.

Reference is now made to FIG. 1 which is a block diagram of an exemplary Power-over-Ethernet (PoE) system 100 in which a plurality of Power Source Equipment (PSE) 110A, 110B devices manage power allocation for redundant links to Powered Device (PD) 140. The system is constructed and operative in accordance with an exemplary embodiment. Because the PD 140 is connected to the plurality of PSEs 110A, 110B over more than one connection, if one of the connections fails, at least one of the other connections continues to provide power to the PD 140. Thus, redundancy is provided in the provision of power to the PD 140.

The plurality of PSEs 110A, 110B may typically be network switches or routers (i.e. endspans). The Powered. Device (PD) 140 may typically be an Internet-of-Things (IOT) device (for example, and without limiting the generality of the foregoing, a wireless access point, an IP telephone device, or an IP camera). As per the adopted the IEEE 802.11ac standard, the PD 140 has at least one connection to one of the plurality of PSEs 110A, 110B through at least one PoE Ethernet cable 170. The PD 140 may be connected to more than one of the plurality of PSEs 110A, 110B. The PoE Ethernet cable 170 which connects the PD 140 to one of the plurality of PSEs 110A, 110B is connected between network device port 150 and one of PSE ports 120A and 120B. A second. PoE. Ethernet cable 170 may connect the PD 140 to another one of the plurality of PSEs 110A, 110B. The second PoE Ethernet cable 170 is connected between network device port 160 and corresponding one of the PSE ports 120A and 120B.

It is appreciated that although PSE ports 120A and 120B are depicted in FIG. 1 as being in two different PSEs 110A, 110B, in some embodiments the two PSE ports 120A and 120B may be comprised in the same PSE 110A. Accordingly, in dotted lines, FIG. 1 also depicts a second port 120B' in one of the PSEs 110A.

PSEs 110A, 110B and PD 140 exchange bi-directional Ethernet data with each other over Ethernet cables 170. Additionally, PSEs 110A, 110B act as Power Source Equipment to provide PoE (i.e., voltage and current) to PD 140 over Ethernet cable 170, as is known in the alt. PSEs 110A, 110B may provide PoE to PD 140 substantially in accordance with the IEEE 802.3 specification/standard, except where techniques presented herein expand and/or modify the standard, as will be described below. In typical implementations, the Ethernet cables 170 are at least category 5 cables, but in some implementations, the Ethernet cables 170 may be category 3 cables, for lower amounts of power. Cable categories, as is known in the art, are classified in ANSI TIA/EIA-568.

In accordance with techniques presented herein, PSEs 110A, 110B and PD 140 negotiate with each other to select a "preferred" PoE power in the PSEs 110A, 110B with which to provide power to the PD 140 in order to increase an overall power efficiency of system 100 relative to other possible PoE powers. Typically, the negotiated preferred PoE power includes additional power which the PSEs 110A, 110B provide to the PD 140 for redundancy. For example, if a total of 12 W is needed by the PD 140, The PD may negotiate to receive a total of 24 W from the PSEs 110A, 110B. That is to say, the PD 140 will negotiate in order to have the PSEs provide an additional 12 W of power for redundancy. In this way, should one of the PSEs 110A, 110B fail to be able to provide the 12 W of power needed by the PD 140, the second one of the PSEs 110A, 110B will continue to provide 12 W to the PD 140. Thus, the PD 140 is still able to operate in the event of failure of a single one of the PSEs 110A, 110B.

Each one of the two PSEs 110A, 110B is also connected to a common power source 130. Since the PSEs 110A, 110B are powered by the common power source 130 the total amount of power available for both of the PSEs 110A, 110B is limited to the amount of power provided by the common power source 130. Thus, it is wasteful for of the two PSEs 110A, 110B to each provide the total 24 W requested by the PD 140. That is to say if, by way of example, the PD 140 requires 12 W and is requesting 24 W from each of two different PSEs 110A, 110B, then, in practice, the PD 140 is requesting 48 W, while only 12 W is needed, and an additional 12 W is needed for redundancy purposes, as will be explained below.

Figure 2:
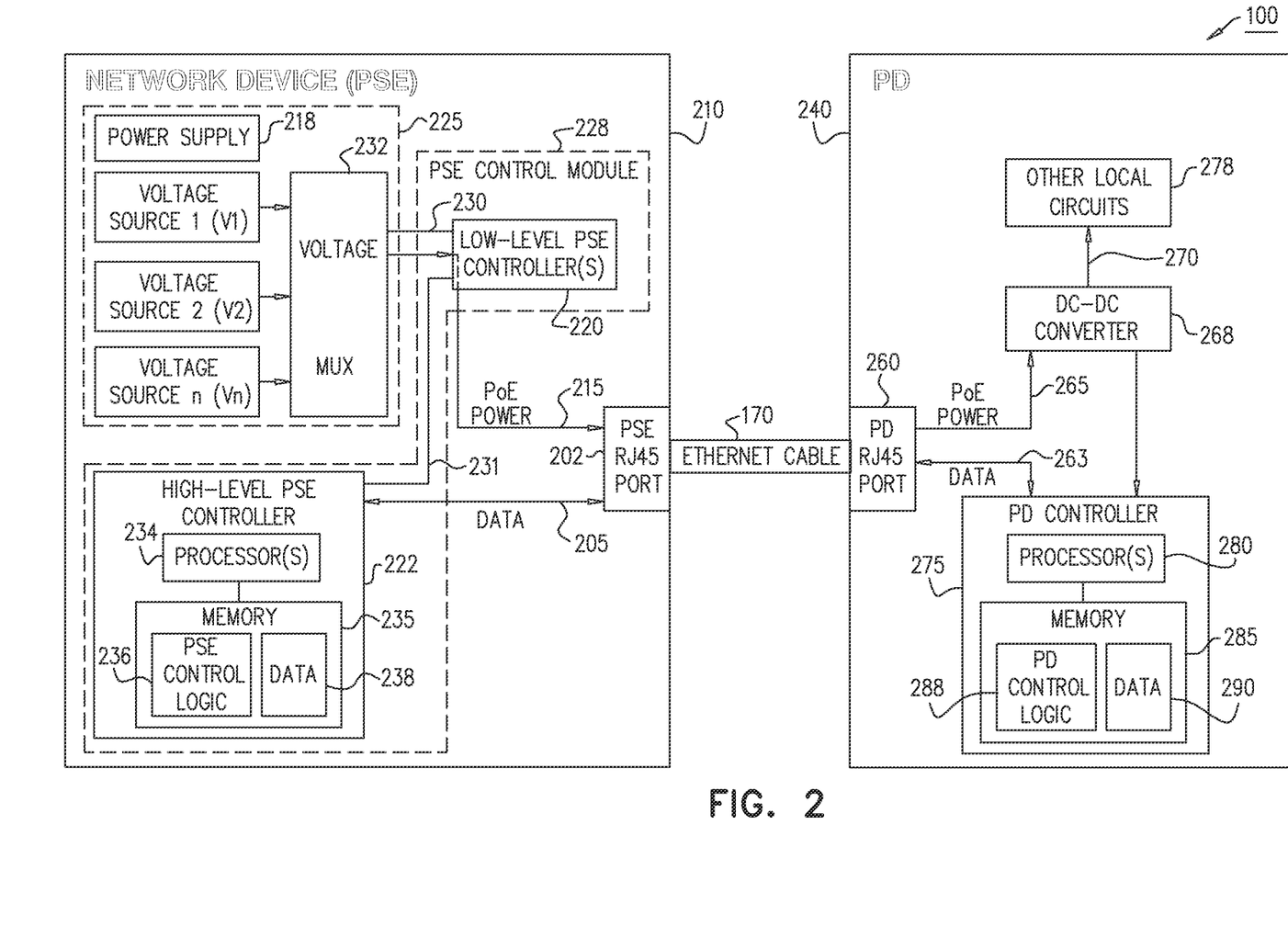
FIG. 2 is a detailed block diagram of one of the PSEs and the PD in the system of FIG. 1, according to an embodiment.

Reference is now additionally made to FIG. 2, which is a detailed block diagram of PSE 210, and PD 240. PSE 210 generally corresponds with the PSEs 110A and 110B of FIG. 1. Similarly, PD 240 generally corresponds with PD 140 of FIG. 1. According to an embodiment, PSE 210 includes PSE RJ45 port 202 (corresponding to ports 120A, 120B, and 120B' of FIG. 1) to couple bi-directional Ethernet data 205 to and from Ethernet cable 170 and inject PoE power 215 to the Ethernet cable 170. The PSE 210 also includes a power supply 218 for providing power for circuits of the PSE 210 as well as the PD 240 (described below) through the PSE RJ45 port 202. The PSE 210 further comprises a low-level PSE controller 220, a high-level PSE controller 222, and a programmable voltage generator 225. The low-level PSE controller 220 and the high-level PSE controller 222 are collectively referred to as a PSE control module 228.

The PSE RJ45 port 202 includes a tapped transformer (not depicted) to combine PoE power 215 with Ethernet data 205 to be transmitted to the PD 240 and inject the combined PoE power 215 and data into the Ethernet cable 170. The PSE RJ45 port 202 receives data transmitted from the PD 240 over the Ethernet cable 170 and provides the received data 205 to the high-level PSE controller 222, as will be explained below.

The programmable voltage generator 225 provides a selected PoE voltage 215 to the PSE RJ45 port 202 via the low-level PSE controller 220 responsive to a control/select signal 230, so as to power the PD 240 over the Ethernet cable 170 at the required PoE power. It is appreciated that by varying the voltage through the programmable voltage generator 225 and the low-level PSE controller 220 that the amount of PoE power 215 provided by the PSE 210 to the PD 240 is also variable. In an embodiment, the voltage generator 225 includes multiple voltage sources, Source 1-Source n, for generating and outputting respective ones of voltages V1-Vn in parallel to a voltage multiplexer 232 of the voltage generator 225. Responsive to the control signal 230, the voltage multiplexer 232 selects one of the voltages V1-Vn, and outputs the selected one of the voltages as PoE voltage (i.e. PoE power) 215 to PSE RJ45 port 202.

The low-level PSE controller 220 performs PSE 210 powering-up operations (including, but not limited to, PoE PD detection, optional classification of a power range to be provided by the PSE 210 to the PD 240 (i.e. an amount of current to be provided by the PSE 210 to the PD 240), start-up) operation, and disconnect, which may be performed in accordance with the IEEE 802.3 specification/standard.

The high-level PSE/network device controller 222 provides general control over the PSE 210, and also implements PSE-side PoE voltage negotiation techniques presented herein. Thus, the high-level PSE controller 222 may also be referred to herein as an "Intelligence and Communication Center" of PSE 210. The high-level controller 222 also generates a signal 231 which is sent to the low level controller 220 in order to control the voltage multiplexer 232. The high-level controller 222 includes a central processing unit (CPU) 234 (also referred to simply as a "processor" 234, and which may, in practice, comprise a plurality of processors 234), and a memory 235. The processor 234 is, for example, a microprocessor or microcontroller that executes software instructions stored in the memory 235 to perform control of the PSE 210, including generation of the signal 231, as mentioned above.

The memory 235 may comprise read only memory (ROM), random access memory (RAM), magnetic disk storage media devices, optical storage media devices, electrical, optical, or other physical/tangible memory storage devices. Thus, in general, the memory 235 may comprise one or more tangible (non-transitory) computer readable storage media (e.g., a memory device) encoded with software comprising computer executable instructions. When the software is executed (by the processor 234) the software is operable to control the PSE 210 and perform the techniques described herein (from the PSE perspective). For example, the memory 235 stores or is encoded with instructions for PSE control logic 236 to perform operations to perform PoE power negotiation and control of the programmable voltage generator 225. In addition, the memory 235 stores data 238 used and generated by the processor 234 when executing control logic 236.

Turning to the PD 240, the PD 240 includes a PD RJ45 port 260 associated with circuits known in the art (not shown) to present to the PSE 240 valid detection and classification signatures responsive to PSE 240 operations, such as detection, classification, and so on. The PD RJ45 port 260 couples bi-directional data 263 to and from the Ethernet cable 170, and includes a tapped transformer (not depicted) to separate received PoE power 265 from data 263 and provide the received PoE voltage power 265 to a Direct Current-to-Direct Current (DC-DC) voltage converter 268.

The DC-DC converter 268 receives the PoE power 265 and produces a converted power (having a voltage) 270 useable within the PD 240, i.e., the voltage converter converts a voltage level of the PoE voltage/power from the Ethernet cable 170 to a different voltage level (i.e., converted voltage 270). The DC-to-DC voltage converter 268 provides the converted voltage 270 to power other circuits of the PD 240, including a PD controller 275, as well as other circuits 278 local to the PD 240.

The PD controller 275 provides overall control of the PD 240 and also implements PD-side PoE voltage negotiation techniques described below. The PD controller 275 is also referred to herein as an "Intelligence and Communication Center" of the PD 240, and performs operations complementary to the "network device controller" 222 of PSE 210. The PD controller 275 includes a central processing unit (CPU) 280 (also referred to simply as a "processor" 280, and which may comprise more than one processor), and a memory 285. The processor 280 is, for example, a microprocessor or microcontroller that executes software instructions stored in the memory 285 to perform control of the PD

240. The memory 285 may be configured similarly to the memory 235 in the PSE 210. Thus in general, the memory 285 may comprise one or more tangible (non-transitory) computer readable storage media (e.g., a memory device) encoded with software comprising computer executable instructions and when the software is executed (by the processor 280), the software is operable to perform the techniques described below. For example, the memory 285 stores or is encoded with instructions for the PD Control logic 288 to perform operations to perform PoE voltage negotiation from the perspective of PD 240. In addition, the memory 285 stores data 290 used and generated by the processor 280 when executing PD control logic 288.

The PD 140, when requesting power primarily for redundancy purposes, will send a message to the PSEs 110A, 110B. The message will identify the request from the PD 140 as being a request for redundant power. The message can be a Cisco Discovery Protocol (CDP) message. For example, the CDP message would be TLV_Type=POWER_REDUNDANCY_TLV, TLV Length=6. The message would hold the system id(mac addr or serial number). It is appreciated, however, that this CDP message is provide by way of example, and is not meant to be limiting. Alternatively, the message may be a LLDP TLV (Link Layer Discovery Protocol Type Length Value) message, as is known in the art.

One of the fields in the message comprises a system IL) of the PD 140. The system ID uniquely identifies the PD 140 across all interfaces. By way of example, the PD 140 might be MAC address or some other device serial number which is uniquely assigned to the PD 140. When a LLDP or a CDP message of the type described above is present then the PSEs 110A, 110B will manage power allocation for all the links coming together as if they were one single request. That is to say, if the PD 140 requests 24 W (12 W which are needed for device operation and an additional 12 W which are requested for redundancy) from multiple PSEs, i.e. PSEs 110A and 110B, then all of the combined PSEs 110A and 110B will only provide the PD 140 with a total of 24 W. One exemplary system of multiple PSEs, i.e. PSEs 110A and 110B which allocate power requests among themselves in the fashion described herein is explained below. Hence, the PSEs 110A, 110B will manage power allocation for the largest request coming from the PD 140 irrespective of which link is used to draw power. The total power draw from the PD 140 will not exceed the amount of power requested in the largest request.

Accordingly, the PSEs 110A, 110B saves on power allocation and therefore can reallocate the saved power (i.e. power which would otherwise be allocated to the PD 140) to provide power to a second PD 140 which requests power from the PSEs 110A and 110B.

In another embodiment, the PSEs 110A, 110B can also respond back to the PD 140 that the PSEs 110A, 110B has taken the POWER_REDUNDANCY_TLV message into account in the PSEs 110A, 110B power allocation logic.

As was noted above in the discussion of FIG. 1, PSEs 110A, 110B might be switches. PoE policing protects a switch from faulty inline powered devices, such as PD 140, that may draw more current than the PSEs 110A, 110B (i.e. the switches) were designed to provide. When a device port, such as PD 140 ports 150, 160, is connected to a PSE port, such as PSE ports 120A, 120B (or 120B'), a line card printed circuit board resident in each of the PSEs 110A, 110B detects, during PoE power up, the type of device connected and allocates an amount of power based on the detection of the device type. The PSEs 110A, 110B set a PoE policing threshold to a value typically 5 percent greater than the allocated power. If the PD 140 consumes more power than specified by the policing threshold for a more than 1 second or some other configurable amount of time (e.g. more than the amount of power allocated based on the device type+an additional 0.5% for more than 1 second), the connected PSE port 120A, 120B shuts down. Depending on a configurable policing action, the PD port 150, 160 may then be disabled, a message might be logged to a console and the port restarted, or some combination of these actions might be taken.

Power policing will also take into account device behavior where power is allocated by the PSEs 110A, 110B taking into account the maximum amount of power the PD 140 requests from among all of the PSEs 110A, 110B, as described herein. In some cases, the PD 140 may draw all of its required power from only one link (e.g. only from PSE 110A). In other cases, the PD 140 may distribute the power draw across all the links (e.g. from both PSE 110A and PSE 110B). In either case, PoE policing takes into account an aggregate power draw from the PSEs 110A, 110B.

In some embodiments, another layer of policing on top of physical port policing supported by hardware available at the present time may be required. For example, and without limiting the generality of the foregoing, in some cases, the two PSE ports may be situated in different switches, as, for example ports 120A, 120B are depicted, and therefore are subjected to a layer of policing on top of physical port policing. While each of PSE 110A and PSE 110B may police its respective local port 120A, 120B (that is PSE 110A may police port 120A and PSE 110B may police port 120B) in order to ensure that the local port 120A, 120B does not exceed its maximum power draw, the two PSEs 110A, 110B need to coordinate with each other in order to police the aggregate power draw of PD 140. Combined policing by an aggregation of PSEs 110A, 110B will involve some messaging between the PSEs 110A, 110B in order that each individual PSE of the two PSEs 110, 110B send its individual power draw values periodically so that the aggregate power draw values can be computed.

Figure 3:
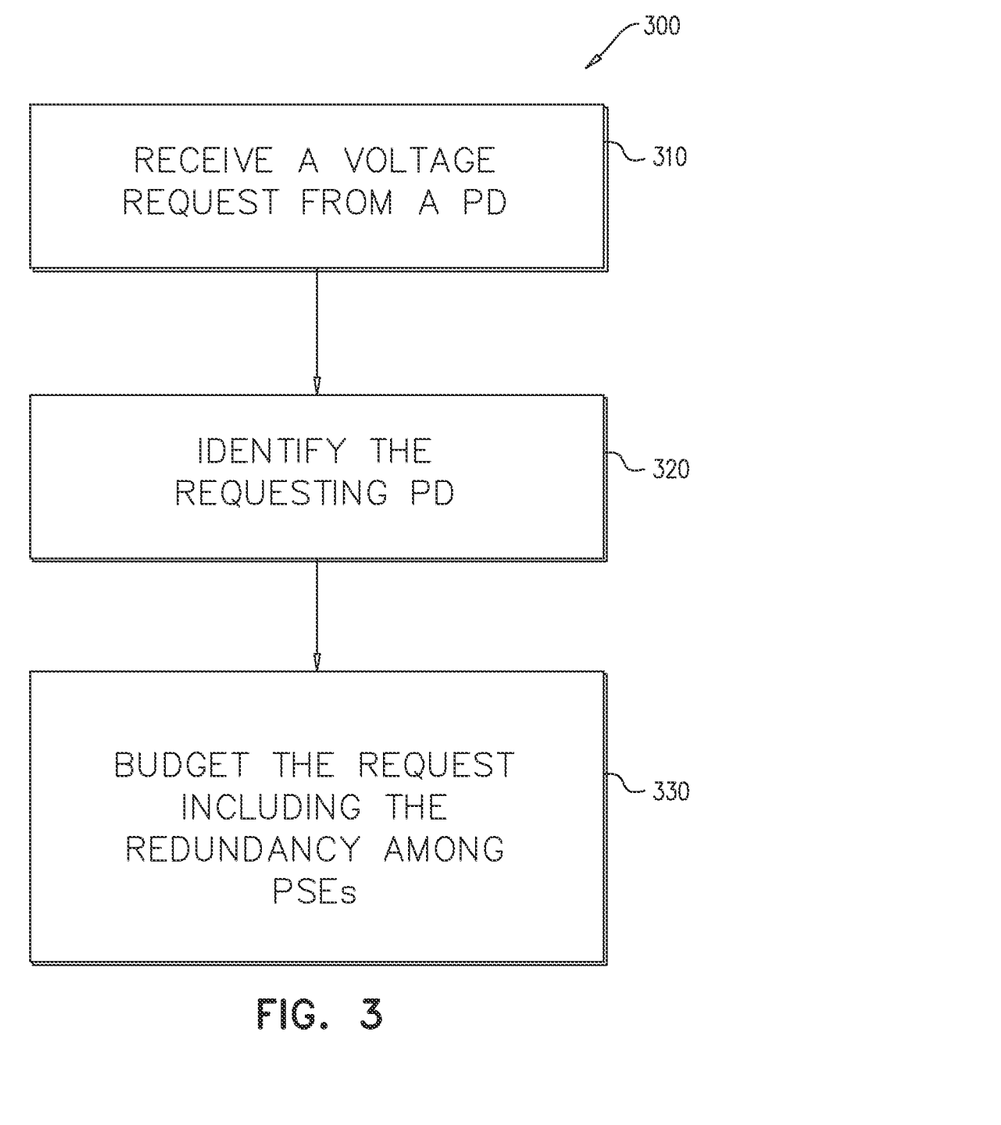
FIG. 3 is a flowchart of an exemplary method of managing allocation of power requested by the PD among the PSEs in the system of FIG. 1.

Reference is now additionally made to FIG. 3, which is a flowchart 300 of one exemplary method of managing allocation of power requested by the PD 140 among the PSEs 110A, 110B in the system of FIG. 1. The method of FIG. 3 is executed at the PSEs 110A, 110B which are configured to provide PoE voltage over the cable 170 to the PD 140. The PD 140 is configured to receive PoE over the cable 170. At step 310, a message, such as the LLDP TLV message described above (or the CDP message described above), is sent by the PD 140, to whichever of the PSEs 110A, 110B the PD 140 is networked with. The PSEs 110A, 110B, in turn, receive the message. As was noted above, the message comprises an identifier which uniquely identifies the requesting PD 140. By extracting the identifier of the PD 140 comprised in the fields of the LLDP TLV (or the CDP message), as described above, the PSEs 110A, 110B identify the requesting PD 140. At step 330, the PSEs 110A, 110B allocate power among themselves in order to allocate the correct amount of power to the PD 140.

The PSEs 110A, 110B are typically located in the same device or in the same power stack. The PSEs 110A, 110B in the same power stack are enabled to exchange messages between themselves. The additional power allocation information between PSEs 110A, 110B would then be included among messages passed between the PSEs 110A, 110B. Certain switches commercially available, for example, Cisco Catalyst 3750-X Series Switches, available from Cisco Technology, Inc., 170 W. Tasman Drive, San Jose Calif., are designed to create a pool of power sharing a common load consisting of all of the switches in a power stack, similar to the PSEs 110A, 110B, at step 330, allocating power among themselves in order to allocate the correct amount of power to the PD 140. The Cisco Catalyst 3750-X Series Switches would be suitable for use with the new LLDP and/or CDP message described above.

Figure 4:
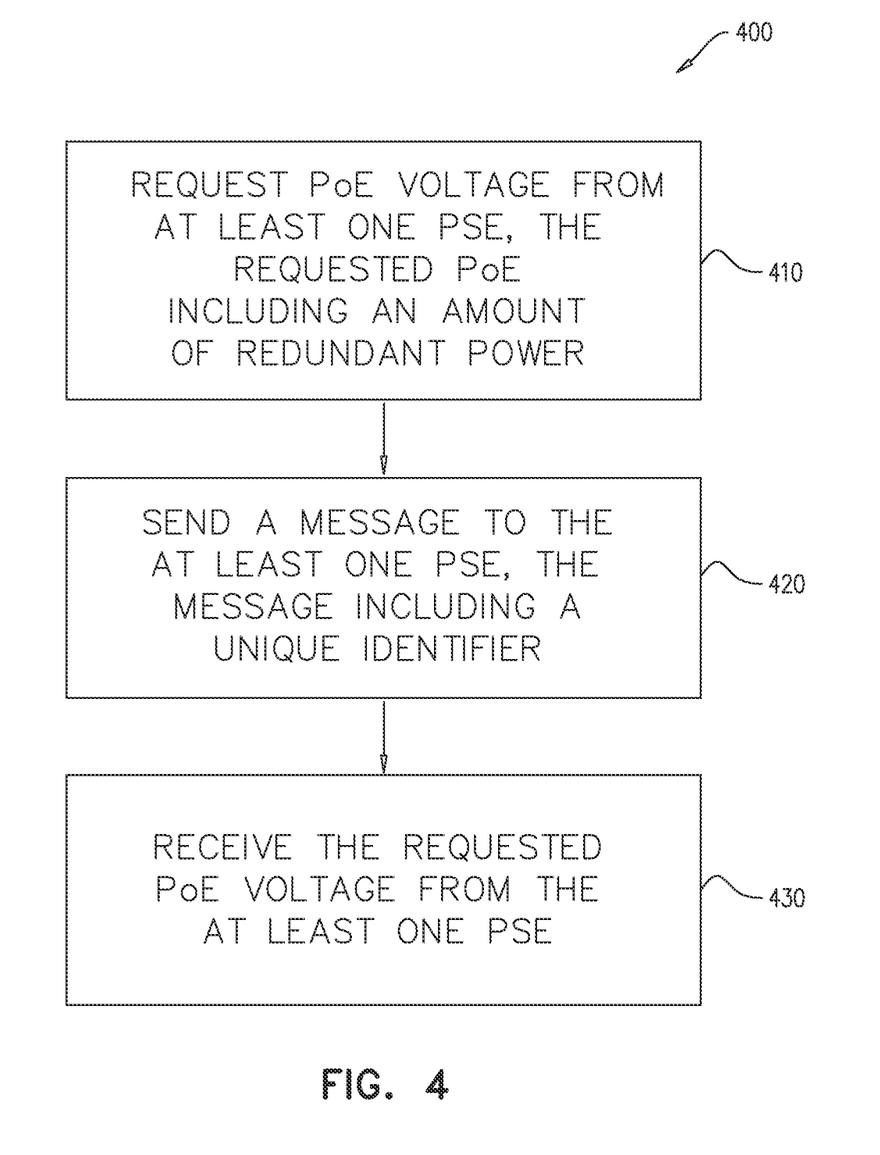
FIG. 4 is a second flowchart of an exemplary method of managing allocation of power requested by the PD among the PSEs in the system of FIG. 1.

Reference is now made to FIG. 4 which is a second flowchart 400 of an exemplary method for the PD 140 to request power which is allocated in a managed fashion by the PSEs 110A, 110B in the system of FIG. 1. The method of FIG. 4 is executed at the PD 140. At step 410, the PD 140 requests PoE from the PSEs 110A, 110B, the requested PoE includes an amount of redundant power to be provided to the PD 140 by the PSEs 110A, 110B. At step 420 the PD 140 sends a message, such as the CDP or LLDP message described above, to the PSEs 110A, 110B. The sent message includes an identifier which is unique to the PD 140. At step 430, the PD 140 receives the requested voltage including the amount of voltage requested for redundancy purposes from the at least one PSEs 110A, 110B.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
at a first Power Source Equipment (PSE) device of a plurality of PSE devices configured to provide Power-over-Ethernet (PoE) to a Powered Device (PD) that is configured to receive PoE power:
receiving a request, sent to the plurality of PSE devices from the PD, requesting a quantity of PoE power, the quantity of PoE power including an amount of power to be provided by the PSE as power for redundancy;
receiving a message from the PD, the message comprising a unique identifier;
negotiating, in response to the request, with a second PSE device of the plurality of PSE devices via a message exchange based upon the unique identifier, a portion of the requested quantity of PoE power to provide to the PD such that the PD receives the requested quantity of PoE power from the plurality of PSE devices and less than the requested quantity of PoE power from each of the plurality of PSE devices; and
providing less than the requested quantity of PoE power to the PD based on the negotiating.

2. The method according to claim 1 wherein the message is a Link Layer Data Protocol (LLDP) Type Length Value (TLV) message.

3. The method according to claim 2 wherein the LLDP TLV message comprises a POWER_REDUNDANCY_TLV message.

4. The method according to claim 1 wherein the unique identifier comprises a MAC address.

5. The method according to claim 1 wherein the unique identifier comprises a PD serial number.

6. The method according to claim 1 wherein the message is a Cisco Discovery Protocol (CDP) message.

7. The method according to claim 6 wherein the CDP message comprises a POWER_REDUNDANCY_TLV message.

8. The method according to claim 1 wherein the PSE sends a second message to the PD acknowledging that the quantity of PoE power which was requested has been allocated to the PD.

9. The method according to claim 1 and further comprising performing power policing by one of the plurality of PSE devices to ensure that the PD is receiving the quantity of PoE power which was requested.

10. The method according to claim 9 wherein the power policing ensures that the quantity of PoE power which was requested does not exceed a maximum amount of power.

11. The method of claim 1, wherein the first PSE device and the second PSE device are arranged within a power stack that provides power to both of the first PSE device and the second PSE device.

12. A method comprising:
at a Powered Device (PD) that is configured to receive Power-over-Ethernet (PoE) over an Ethernet cable from a plurality of Power Source Equipment (PSE) devices configured to provide PoE power over the Ethernet cable:
requesting PoE power from each of the plurality of PSE devices, the requesting of the PoE power including a request for an extra amount of power from the each of the plurality of PSE devices to provide redundancy;
sending a message to each of the plurality of PSE devices, the message uniquely identifying the PD by including a unique identifier in the message; and
receiving the PoE power from the plurality of PSE devices, wherein receiving the PoE power comprises receiving less than the PoE power from each of the plurality of PSE devices in response to a negotiation between the plurality of PSE devices.

13. The method according to claim 12 wherein the message is a Link Layer Data Protocol (LLDP) Type Length Value (TLV) message.

14. The method according to claim 13 wherein the LLDP TLV message comprises a POWER_REDUNDANCY_TLV message.

15. The method according to claim 12 wherein the unique identifier comprises a MAC address, a PD serial number, or the MAC address and the PD serial number.

16. The method according to claim 12 wherein the message is a Cisco Discovery Protocol (CDP) message.

17. The method according to claim 16 wherein the CDP message comprises a POWER_REDUNDANCY_TLV message.

18. The method according to claim 12 wherein the PD receives a second message from one or more of the plurality of PSE devices acknowledging that the requested PoE power has been allocated to the PD.

19. A Powered Device (PD) comprising:
- a power circuit configured to receive Power-over-Ethernet (PoE) over an Ethernet cable from a plurality of Power Source Equipment (PSE) devices configured to provide PoE power over the Ethernet cable;
- a processor;
- a computer readable memory including instructions that when executed by the processor cause the processor to perform operations comprising:
  - requesting PoE power from each of the plurality of PSE devices, the requesting of the PoE power including a request for an extra amount of power from the each of the plurality of PSE devices to provide redundancy;
  - sending a message to each of the plurality of PSE devices, the message uniquely identifying the PD by including a unique identifier in the message; and
  - receiving the PoE power from the plurality of PSE devices, wherein receiving the PoE power comprises receiving less than the PoE power from each of the plurality of PSE devices in response to a negotiation between the plurality of PSE devices.

20. The Powered Device of claim 19, wherein the operations further comprise receiving a second message from one or more of the plurality of PSE devices acknowledging that the requested PoE power has been allocated to the PD.

* * * * *